United States Patent
Cevik et al.

(10) Patent No.: US 8,140,330 B2
(45) Date of Patent: Mar. 20, 2012

(54) SYSTEM AND METHOD FOR DETECTING REPEATED PATTERNS IN DIALOG SYSTEMS

(75) Inventors: Mert Cevik, Atlanta, GA (US); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 885 days.

(21) Appl. No.: 12/139,401

(22) Filed: Jun. 13, 2008

(65) Prior Publication Data

US 2009/0313016 A1 Dec. 17, 2009

(51) Int. Cl.
*G10L 15/00* (2006.01)
*G10L 15/04* (2006.01)
*G10L 15/10* (2006.01)
*G10L 15/12* (2006.01)

(52) U.S. Cl. ......... 704/241; 704/238; 704/239; 704/253

(58) Field of Classification Search ............ None
See application file for complete search history.

(56) References Cited

U.S. PATENT DOCUMENTS

| | | | |
|---|---|---|---|
| 6,697,782 B1 * | 2/2004 | Iso-Sipila et al. | 704/275 |
| 7,062,435 B2 * | 6/2006 | Tzirkel-Hancock et al. | 704/241 |
| 7,174,292 B2 * | 2/2007 | Deng et al. | 704/226 |
| 7,809,566 B2 * | 10/2010 | Meermeier | 704/255 |
| 7,827,032 B2 * | 11/2010 | Braho et al. | 704/251 |
| 2004/0024601 A1 * | 2/2004 | Gopinath et al. | 704/270 |
| 2004/0249637 A1 * | 12/2004 | Baker | 704/239 |

OTHER PUBLICATIONS

Naoko Kakutani, Norihide Kitaoka, Seiichi Nakagawa, "Detection and Recognition of Repaired Speech on Misrecognized Utterances for Speech Input of Car Navigation System," 7th International Conference on Spoken Language Processing Sep. 16-20, 2002, Denver, Colorado, USA.*

L. R. Rabiner and M. R. Sambur, "An Algorithm for Determining the Endpoints of Isolated Utterances," Bell System Tech. Jour., vol. 54, No. 2, pp. 297 315, Feb. 1975.*

* cited by examiner

*Primary Examiner* — Matthew Sked
(74) *Attorney, Agent, or Firm* — Dergosits & Noah LLP; Geoffrey T. Staniford

(57) ABSTRACT

Embodiments of a method and system for detecting repeated patterns in dialog systems are described. The system includes a dynamic time warping (DTW) based pattern comparison algorithm that is used to find the best matching parts between a correction utterance and an original utterance. Reference patterns are generated from the correction utterance by an unsupervised segmentation scheme. No significant information about the position of the repeated parts in the correction utterance is assumed, as each reference pattern is compared with the original utterance from the beginning of the utterance to the end. A pattern comparison process with DTW is executed without knowledge of fixed end-points. A recursive DTW computation is executed to find the best matching parts that are considered as the repeated parts as well as the end-points of the utterance.

22 Claims, 8 Drawing Sheets

Algorithm 2.1: RECURSIVE DTW COMPUTATION($R_i, T$)

for $startingframe \leftarrow 1$ to $M - N$
$\begin{cases} \text{compute } D_{min} \\ \text{if } D_{min} < threshold \\ \quad \text{then save the frames as repetition} \end{cases}$

FIG. 6A

Algorithm 2.2: REPETITION DETECTION ALGORITHM($R, T$)

for each reference pattern
do $\begin{cases} \text{compute local distance matrix} \\ \text{if } N \leq max.ref.length \\ \quad \text{then RECURSIVE DTW COMPUTATION}(R_i, T) \\ \text{else } \begin{cases} \text{while } N > max.ref.length \\ \text{do } \begin{cases} \text{generate } R_c \text{ from } R_i \\ \text{RECURSIVE DTW COMPUTATION}(R_c, T) \\ N \leftarrow N - 1 \end{cases} \end{cases} \end{cases}$

FIG. 6B

Experimental setup

| Feature vectors | 13-dimension MFCC |
|---|---|
| Sampling frequency | 8000-16000 Hz |
| Window | Hamming window |
| Frame length | 20 ms |
| Frame shift | 10 ms |
| Liftering function | Raised sine |
| Accumulated distance threshold | 110 |

400
SYSTEM AND METHOD FOR DETECTING REPEATED PATTERNS IN DIALOG SYSTEMS

FIELD

Embodiments of the invention relate generally to dialog systems, and more specifically to a process of detecting repetitive patterns in dialog systems.

BACKGROUND

A dialog system is a computer system that is designed to converse with a human through a coherent structure using text, speech, graphics, or other modes of communication on both the input and output channels. Dialog systems that employ speech are referred to as spoken dialog systems and generally represent the most natural type of machine-man interface. A major challenge in designing dialog systems is to ensure that they correctly understand the user's vocal input. At present, no speech recognition system is 100% perfect, and thus all systems suffer from some degree of fault with regard to input recognition. A user often responds to misunderstood input by repeating the utterance that is problematic for the system. Thus, the presence of repeated utterances by a user is a good indication that the dialog system is not operating properly. However, many systems do not detect such repeated utterance reliably enough so that corrections can be properly made. This problem can be due to several factors, such as the variability of users, which makes it difficult to detect repeats accurately, or changes in user input while repeating word or phrase. When a spoken dialog system conveys back a misunderstood message, it is not uncommon for a user to repeat the utterance with certain acoustic variations. These variations can lead to worse recognition performance, and create further misunderstanding, thus leading to low user satisfaction.

Present methods of repeat detection in dialog systems often use dynamic time warping (DTW) processes. DTW is a process for measuring the similarity between two sequences which may vary in time or speed. It finds an optimal match between two sequences by warping them non-linearly in the time dimension to determine a measure of their similarity independent of certain non-linear variations in the time dimension. A common application of this method is in present car-navigation systems, which use DTW and N-best hypotheses overlapping measures on a location name input task. This system takes only the misrecognized parts of the original utterance as the correction utterance, and judges whether the correction utterance is included in the original utterance. For more spontaneous speech, the system can be extended to detect the common parts between the original and correction utterances, where the repeated content may appear at any position within the correction utterance. A significant drawback to this system is that the order of the words or components of the repeated utterance must be the same as in the original utterance. Since users can easily alter the order of words while repeating them to the system, such a limitation can effectively impact the performance of the speech recognition capability of the system.

Present repeat detection systems also often require access to the internal components of the speech recognizer process. Such access is often not convenient or even available, thus further limiting the effectiveness of these repeat detection systems.

What is needed, therefore, is a dialog system that reliably detects repetitions in user input without requiring access to the internal information of the speech recognition engine.

What is further needed is a dialog system that detects repeats without requiring the order of the words within a repeated phrase be the same in the correction utterance and the original utterance.

BRIEF DESCRIPTION OF THE DRAWINGS

Embodiments of the present invention are illustrated by way of example and not limitation in the figures of the accompanying drawings, in which like references indicate similar elements and in which:

FIG. 6A illustrates a code segment for an example computational routine or subprogram for recursive DTW, under an embodiment.

FIG. 6B illustrates a code segment for an example repetitive computational routine or subprogram for recursive DTW, under an embodiment.

DETAILED DESCRIPTION

Figure 1:
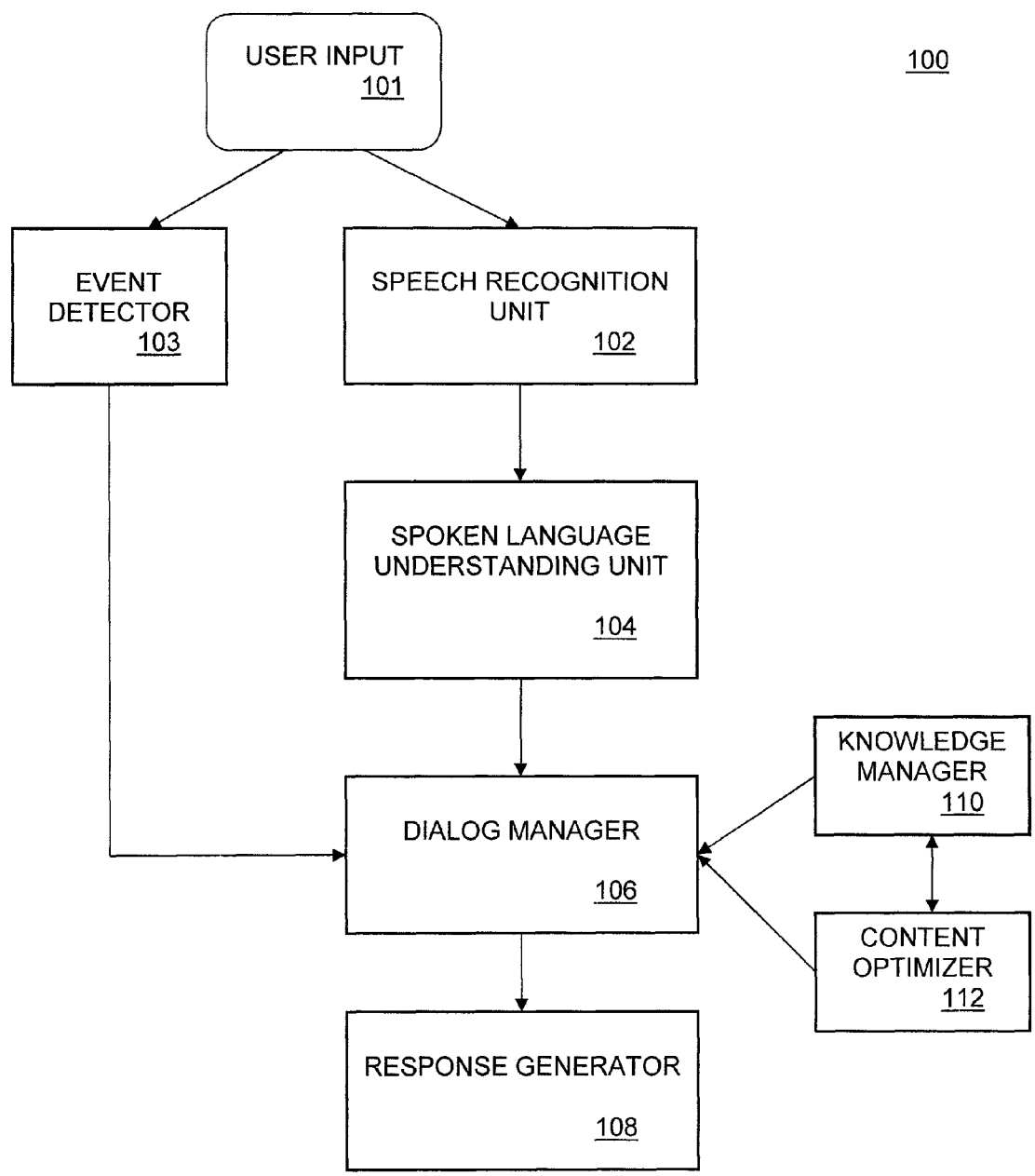
FIG. 1 is a block diagram of a spoken dialog system that incorporates a repeat detection process, according to an embodiment.

Embodiments of a method and system for detecting repeated patterns in dialog systems are described. The system includes a dynamic-time warping (DTW) based pattern comparison algorithm that is used to find the best matching parts between a correction utterance and the original utterance. Reference patterns are generated from the correction utterance by an unsupervised segmentation scheme. The system does not require information about the position of the repeated parts in the correction utterance, thus each reference pattern is compared with the original utterance from the beginning of the utterance to the end. A pattern comparison process using Dynamic Time Warping (DTW) is executed without knowledge of fixed end-points. A recursive DTW computation is executed to find the best matching parts that are considered as the repeated parts as well as the end-points of the utterance.

In the following description, numerous specific details are introduced to provide a thorough understanding of, and enabling description for, embodiments of the repeat detection process for dialog systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In general, repetitions in dialog sessions in spontaneous speech constitute important information about the content. This information can be used in various applications in speech processing such as improving the performance or determining the content and processing for further applications. Typically, repetitions in dialog systems comprise words, phrases or syllables that are repeated by a user in response to an incorrect output from the dialog system. Thus, the repeated parts may be certain discrete words or phrases, and all or only certain parts of an original utterance may be repeated within the contents of a subsequent correction utterance. Oftentimes, the repeated words are not repeated in the same way or in the same order within the repeated phrase, and may also be accompanied by additional prefixes or suffixes indicating variations.

Embodiments of the repeat detection system described herein detect whether at least some parts of an original utterance are repeated in a correction utterance. The system extracts these repeated parts without requiring any information about the order and position of the words within the original and corrected utterance. Such a repetition detection system can be incorporated into a spoken dialog system that supports various functions and applications to allow users to interact with devices and receive services while performing other cognitively demanding, or primary tasks, such as driving or operating machinery. Portions of the dialog system can use commercially available or proprietary components for language applications.

FIG. 1 is a block diagram of a spoken dialog system that incorporates a repeat detection process, according to an embodiment. Each of the blocks of FIG. 1 may represent a hardware, software, or combination hardware/software component that comprises or is part of a computing device or executable component. For purposes of the following description, the terms "process," "module," "component," or "system" are used interchangeably to denote a functional block within a system, and that may be implemented as either hardware, software, or a combination of hardware and software (e.g., firmware). Furthermore, some of the functional blocks of FIG. 1 may be combined into a single physical component or program, or they may be partitioned into a plurality of sub-modules or components.

The core components of system 100 include a speech recognizer 102 that directly receives spoken user input 101, a spoken language understanding (SLU) module 104 with multiple understanding strategies for imperfect input, a dialog manager (DM) 106 that handles multiple dialog threads and mixed initiatives, a knowledge manager (KM) 110 that controls access to ontology-based domain knowledge, and a content optimizer 112 that connects to the dialog manager and the knowledge manager for resolving ambiguities from the users' requests, regulating the amount of information to be presented to the user, as well as providing recommendations to users. The dialog manager 106 provides output through a response generator 108.

In one embodiment, spoken user input 101 produces acoustic waves that are received by the speech recognition unit 102. The speech recognizer 102 can include components to provide functions, such as dynamic grammars and classbased n-grams. For the embodiment of FIG. 1, the user input 101 is also directly input to an event detector 103. The event detector can be configured to detect a number of different pre-defined events, such as speed of speech, volume, prosodic events, and other speech-related events. The event detector is also configured to detect repetitive user input manifested as repeated words or phrases. In one embodiment, the event detector is optimized to detect repetitive utterances between an original input by the user and a corrected input that is uttered by the user in response to a dialog system output. The event detector 103 is thus configured to detect repeated utterances by a user due to incorrect speech recognition by the system in the following sequence:

Original User Input→Dialog System Output→Corrected User Input

In this sequence, the dialog system attempted to understand the user's original input and generated a response indicating what it had heard. Because it was incorrect, the user repeated the original input as a corrected user input. The original input is also referred to as the "test" sequence, and the corrected input is also referred to as the "reference" sequence. In an ideal case, the user will repeat the same exact phrase for the corrected input as original input. Very often, however, the user may repeat only some of the words (by dropping or adding words), or even all of the words in the corrected input, but in a different order than the original, so that the corrected sequence will not be an exact replica of the original sequence with respect to word order.

For example, the original or test utterance may be as follows "Please find a French restaurant with a five-star rating in Oakland" and the corrected or reference utterance may be "I'm looking for a five-star French restaurant in Oakland," In this example, the italicized words are repeated between the two utterances, however they are out of order between the two sequences. The original sequence may be represented as:

a-B-c-D-e-F, where B, D, and F, represent the repeated phrases "French restaurant," "five-star," and "in Oakland," respectively. The corrected utterance is then:

g-D-B-F where a, c, e and g represent unrepeated phrases between the two utterances.

As can be seen in this example, the repeated phrases B, D, and F, are present in both the original and corrected utterances, but are in a different order with different intermediate phrases.

Present repetition detection systems that are based on dynamic time warping (DTW) and N-best hypotheses overlapping measures can typically only detect repeats if the order of the words in both of the utterances is the same. Such systems would thus have trouble with common correction patterns, such as the example above, in which the repeated parts have an arbitrary order and position.

In one embodiment, a repetition detection system extracts the boundaries of the repeated parts of phrases of the utterances by utilizing the spectral characteristics of the utterances. This system uses no speech recognition-based information. A segmentation process defines the boundaries of the reference patterns. Proper segmentation is necessary to generate reference patterns that can be used for the pattern comparison. An unsupervised segmentation process partitions the correction utterance into fragments that have boundaries close to the actual words. A dynamic-time warping (DTW)-based pattern comparison algorithm is used to compare the reference patterns with the original utterance. Pattern comparison with DTW is executed without the knowledge of fixed end-points. A recursive algorithm for DTW computation is generated to find the best matching parts that are considered as the repeated parts as well as the end-points in the original utterance.

As shown in FIG. 1, the spoken user input 101 is taken as the inputs to the system 100. In a typical implementation, the user input 101 comprises an original utterance, also referred to as a "test" utterance or sequence, and a correction utterance, also referred to as a "reference" utterance or sequence that is provided by the user in response to output from the dialog system. The event detector 103 detects the occurrence of repeated patterns between the test and reference utterances and then performs processes comprising: segmentation of the correction utterance, feature extraction, pattern comparison and decision rule implementation.

Figure 2:
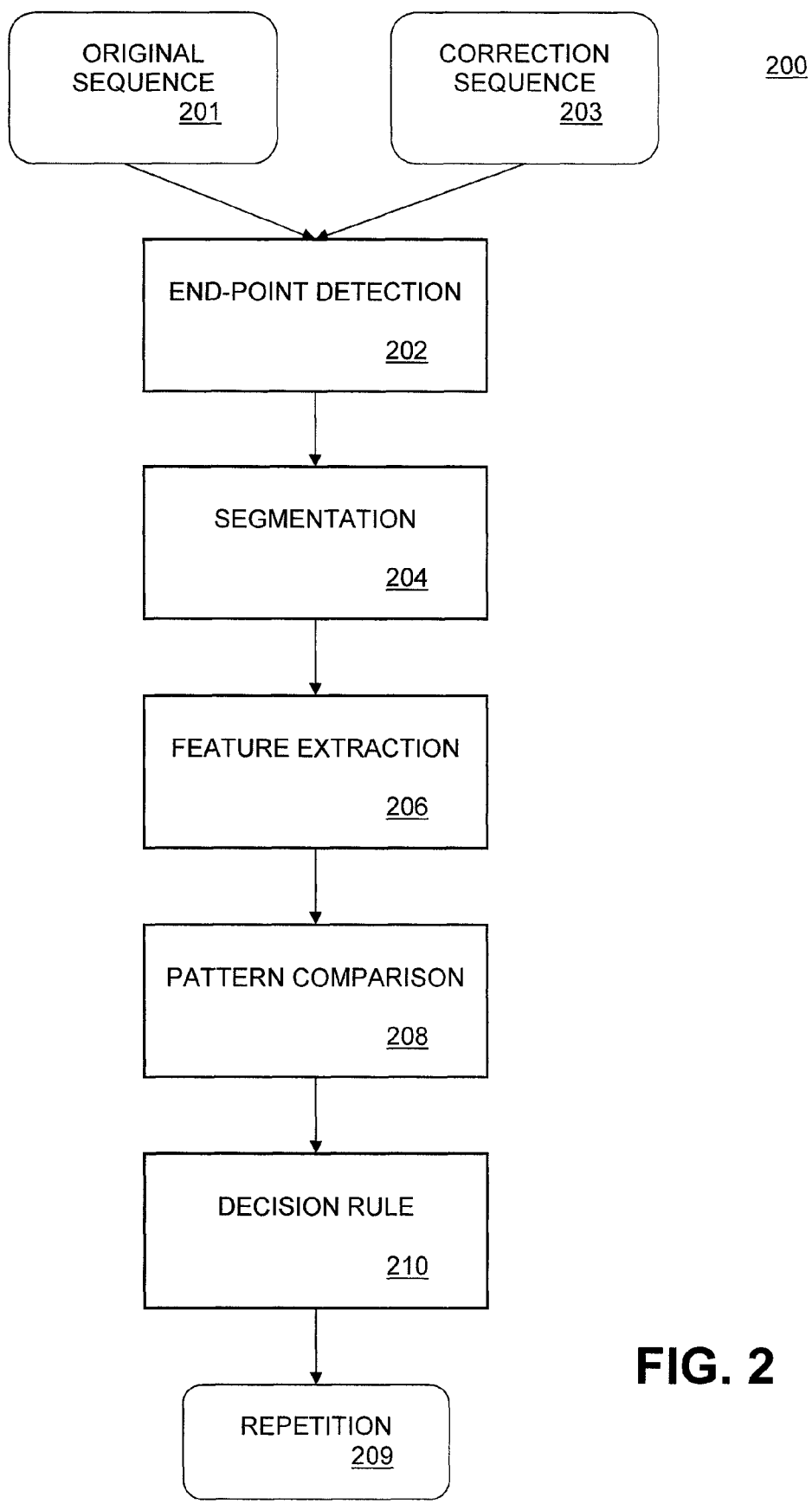
FIG. 2 is a block diagram illustrating the functional components of a repetition detection process, under an embodiment.

FIG. 2 is a block diagram illustrating the functional components of a repetition detection process 200, under an embodiment. As shown in FIG. 2, both the original (test) and correction (reference) sequences are taken as inputs to an end-point detection component 202. The primary components of the system of FIG. 2 are segmentation process 204 for segmenting the utterances, feature extraction process 206, pattern comparison process 208, and decision rule process 210. The output of process 200 are any sequences or sequence portions that are determined to be repeats or repetitions 209 between the original 201 and correction 203 sequences.

Before processing the input signals 201 and 203, end-point detection is performed to remove the non-speech parts at the beginning and end of the utterances by using an end-point detection algorithm. Any appropriate end-point detection algorithm or process may be used. The energy thresholds found in the end-point detection process are further used in the segmentation process 204.

The correction utterance is segmented by segmentation process 204 according to the energy threshold found in the end-point detection step to generate appropriate reference patterns. The original utterance is taken as the test pattern. Feature vectors are extracted from the test and reference patterns by feature extraction process 206. Each reference pattern is compared with the test pattern from the beginning to the end by a DTW algorithm in pattern comparison process 208, and the distance scores are computed using a distance scoring process. The parts of the test pattern that correspond to the reference pattern with a distance score below a threshold are selected as candidates of repetitions. The matching parts that are selected as candidates of repetitions are further classified as repetitions or non-repetitions according to the length and distance score. The threshold is defined by the decision rule block 210. In one embodiment, the appropriate threshold value is determined by experimental data. Alternatively, a computational process to determine an appropriate threshold can be defined based on the requirements and constraints of the dialog system.

Figure 3:
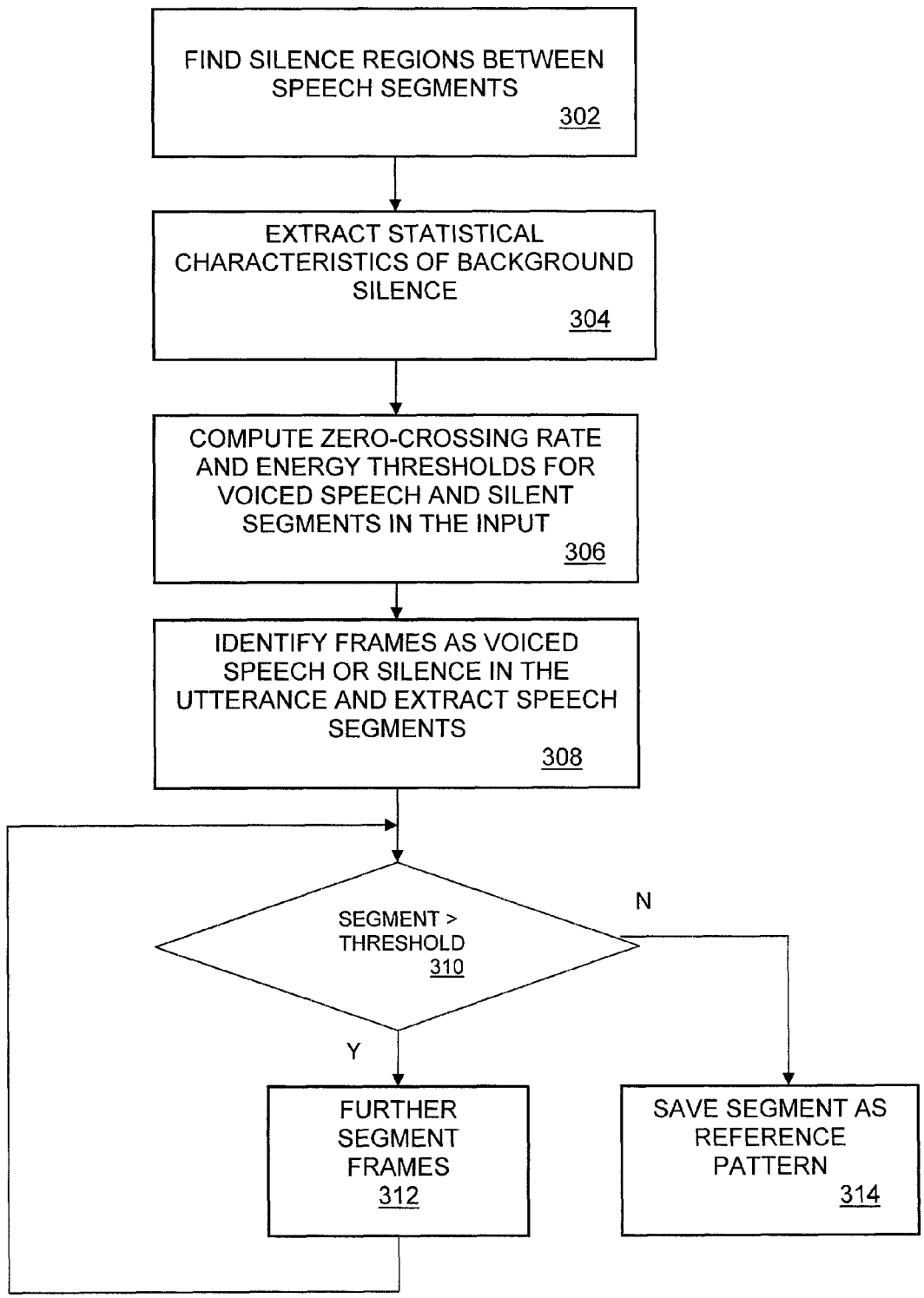
FIG. 3 illustrates the process of segmentation in a repetition detection system, under an embodiment.

In the segmentation process 204, the correction utterance is segmented, and reference patterns are generated. FIG. 3 illustrates the process of segmentation in a repetition detection system, under an embodiment. The first step of segmentation is finding the silence regions that separate the speech segments, block 302. The statistical characteristics of the background silence are extracted by the end-point detection algorithm, block 304. A zero-crossing rate (IZCT) threshold is computed for the unvoiced speech as well as an energy threshold (ITL) for the voiced speech input, block 306. In general, the zero-crossing rate is the rate of sign-changes along a signal, i.e., the rate at which the signal changes from positive to negative or back.

The IZCT and ITL thresholds are used to identify the frames as voiced/unvoiced speech and silence throughout the correction utterance. The speech segments between the silence regions are then extracted, block 308. According to a length threshold these segments are further segmented or saved as reference patterns. Thus, a minimum segment length threshold is defined, and in block 310 the process determines if the segment length is greater or less than the threshold. The speech segments that are longer than the threshold are further segmented according to the minima of the short-time energy spectrum, block 312. Segments that are shorter than the threshold are saved as reference patterns, block 314. This process generates reference patterns that have a certain maximum number of frames.

Figures 4A, 4B:
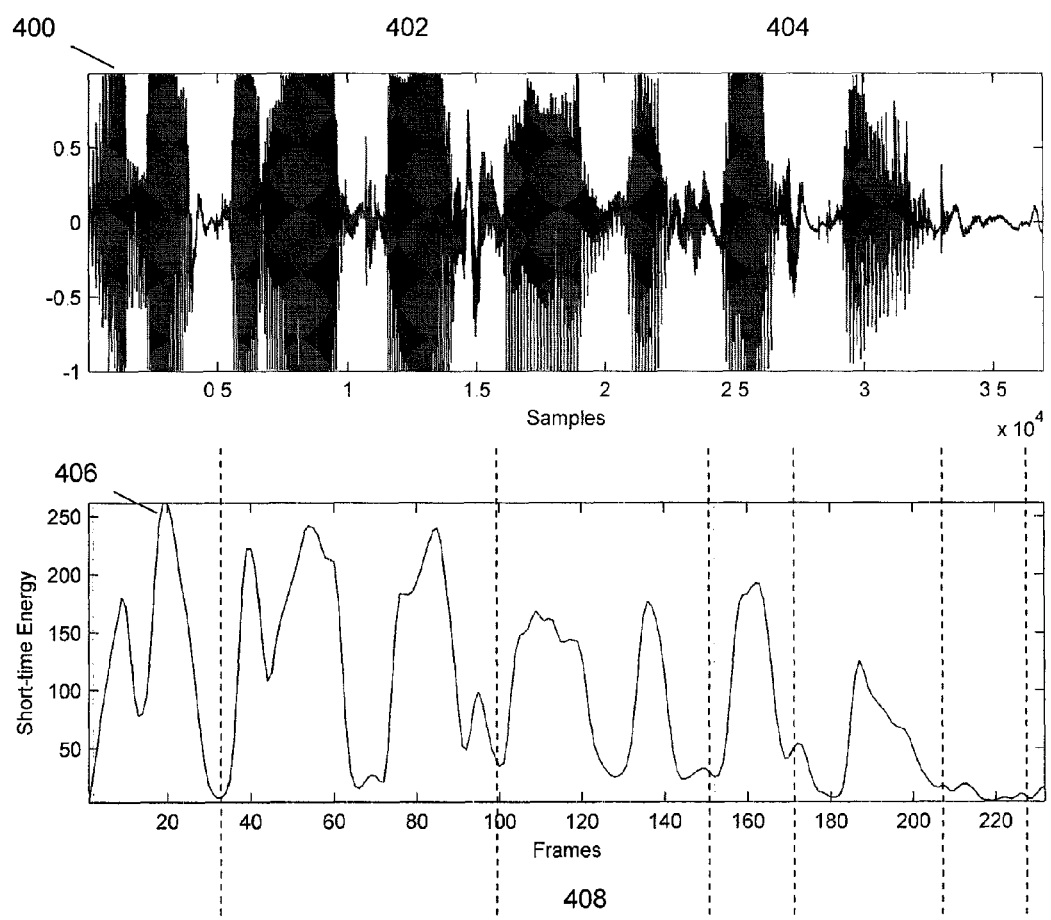
FIGS. 4A and 4B illustrate the segmentation of a correction utterance into reference patterns, under an embodiment.

FIGS. 4A and 4B illustrate the segmentation of a correction utterance into reference patterns, under an embodiment. In FIG. 4A, the waveform 400 for an example correction utterance is shown as a graph of signal power level (e.g., dB) versus time (e.g., seconds). The waveform consists of certain voiced sections 402 separated by certain unvoiced or silent sections 404. This input spoken waveform is processed by a segmentation process 204, such as illustrated in FIG. 3 to create the segmented plot of the correction utterance, as shown in FIG. 4B. This plot 406 tracks the short-time energy of the waveform versus a frame length count. The segmentation process 204 divides the correction utterance waveform 406 into a number of segments 408, which are each of a length that is less than a defined threshold number of frames.

Once the correction utterance is segmented, features are extracted by feature extraction process 206. In one embodiment, Mel-frequency cepstral coefficients are used as feature parameters. In sound processing, the Mel-frequency cepstrum (MFC) is a representation of the short-term power spectrum of a sound, based on a linear cosine transform of a log power spectrum on a nonlinear Mel scale of frequency. The Mel-frequency cepstral coefficients (MFCCs) are coefficients that collectively make up a Mel-frequency cepstrum, and are derived from a type of cepstral representation of the audio clip. The difference between the cepstrum and the Mel-frequency cepstrum is that in the MFC, the frequency bands are equally spaced on the Mel scale, which approximates the human auditory system's response more closely than the linearly-spaced frequency bands used in the normal cepstrum. This frequency warping can allow for better representation of sound, for example, in audio compression. In one embodiment, the Mel-frequency cepstral coefficients are derived by a process that first takes the Fourier transform of a windowed excerpt of a signal; maps the powers of the spectrum obtained above onto the Mel scale, using triangular overlapping windows; takes the logs of the powers at each of the Mel frequencies; takes the discrete cosine transform of the list of Mel log powers, as if it were a signal. In this process, the Mel-frequency cepstral coefficients are the amplitudes of the resulting spectrum. Other variations of this process are possible, such as differences in the shape or spacing of the windows can be used to map the scale.

In general, the segmented waveform represents the conversion of test data into templates. The recognition process then consists of matching the incoming speech with stored templates. The template with the lowest distance measure from the input pattern is a matched segment. The best match (lowest distance measure) is based upon a Dynamic Time Warping (DTW) word recognizer process. In general, features represent the information in each signal has to be represented in some manner. The features are used to compute distances, in which a distance is a metric that is used to obtain a match path. There are two basic distance measures: local, which a computational difference between a feature of one signal and a feature of the other, and global, which is the overall computational difference between an entire signal and another signal of possibly different length.

Feature vectors could have multiple elements, and thus, a means of calculating the local distance is required. In one embodiment, the distance measure between two feature vectors is calculated using the Euclidean distance metric. In this case, the local distance between feature vector x of signal 1 and feature vector y of signal 2 is given by the following equation:

$$d(x, y) = \sqrt{\sum_i (x_i - y_i)^2}$$

Since speech is a time-dependent process, the utterances of the same word may have different durations, and utterances of the same word with the same duration may differ in the middle, due to different parts of the words being spoken at different rates. To obtain a global distance between two speech patterns, represented as a sequence of vectors, a time alignment must be performed. To reduce excessive computation, certain restrictions are applied on the direction of propagation. These include the requirements that matching paths cannot go backwards in time; every frame in the input must be used in a matching path; and local distance scores are combined by adding to give a global distance. In the context of template-based speech recognition, this algorithm is a Dynamic Time Warping (DTW) process. This process finds the lowest distance path through the matrix, while minimizing the amount of computation, and operates in a time-synchronous manner in which each column of the time-time matrix is considered in succession (equivalent to processing the input frame-by-frame) so that, for a template of length N, the maximum number of paths being considered at any time is N.

For example, if $D(i,j)$ is the global distance up to $(i,j)$ and the local distance at $(i,j)$ is given by $d(i,j)$, then global distance is calculated as:

$$D(i, j) = \min[D(i-1, j-1), D(i-1, j), D(i, j-1)] + d(i, j) \quad (1)$$

Since $D(1,1)=d(1,1)$ as the initial condition, there is a basis of an efficient recursive algorithm for computing $D(i,j)$, and the final global distance $D(n,N)$ provides the overall matching score of the template with the input. The input word is then recognized as the word corresponding to the template with the lowest matching score.

In one embodiment, feature vectors of a defined dimension size, e.g., 13-dimension, are generated at a certain frame rate, e.g., 100 frames/second. Before computing the distance scores between the feature vectors, variability of the cepstral coefficients and their significance should be considered. It has been shown generally that suppression of high cepstral coefficients leads to a more reliable measurement of spectral distances. The variability of the low cepstral coefficients depends on the factors that do not essentially represent the phonetic content of the sound. In one embodiment, a cepstral liftering procedure is applied to control the non-information bearing components of the cepstral coefficients for reliable discrimination of the sounds.

A raised sine liftering function is defined by equation (2) below for weighting the cepstral coefficients where L is the length of the lifter and h is chosen as L/2. The liftering process reduces the sensitivity of the features without altering the formant structure of the speech.

$$w(n) = \begin{cases} 1 + h\sin\left(\frac{n\pi}{L}\right) & \text{for } n = 1, 2, \ldots, L \\ 0 & \text{for } n \leq 0, n \geq L \end{cases} \quad (2)$$

As stated above, in an embodiment, the original utterance which is taken as the test pattern is compared with the reference patterns by a DTW process. For a given a test pattern given by $T=\{T(1), T(2), \ldots, T(M)\}$, where $T(m)$ is the spectral vector of the input test signal at time m, and a reference pattern given by $R=\{R(1), R(2), \ldots, R(N)\}$, where $R_v(n)$ is the spectral vector of the $v^{th}$ reference signal at time n, a non-linear time alignment function of the form $m=w(n)$ is solved to minimize the accumulated distance equation (3):

$$D = \sum_{n=1}^{N} d(R(n), T(w(n))) \quad (3)$$

The Euclidean distance is computed as the frame-wise local distance ($d(n,m)$) based on defined local continuity constraints and slope weights. A set of given local continuity constraints is as follows (equation (4)):

$$D(m, n) = \min\begin{cases} D(m-2, n-1) + d(m-1, n) + d(m, n) \\ D(m-1, n-1) + d(m, n) \\ D(m-1, n-2) + d(m, n-1) + d(m, n) \end{cases} \quad (4)$$

Figure 5:
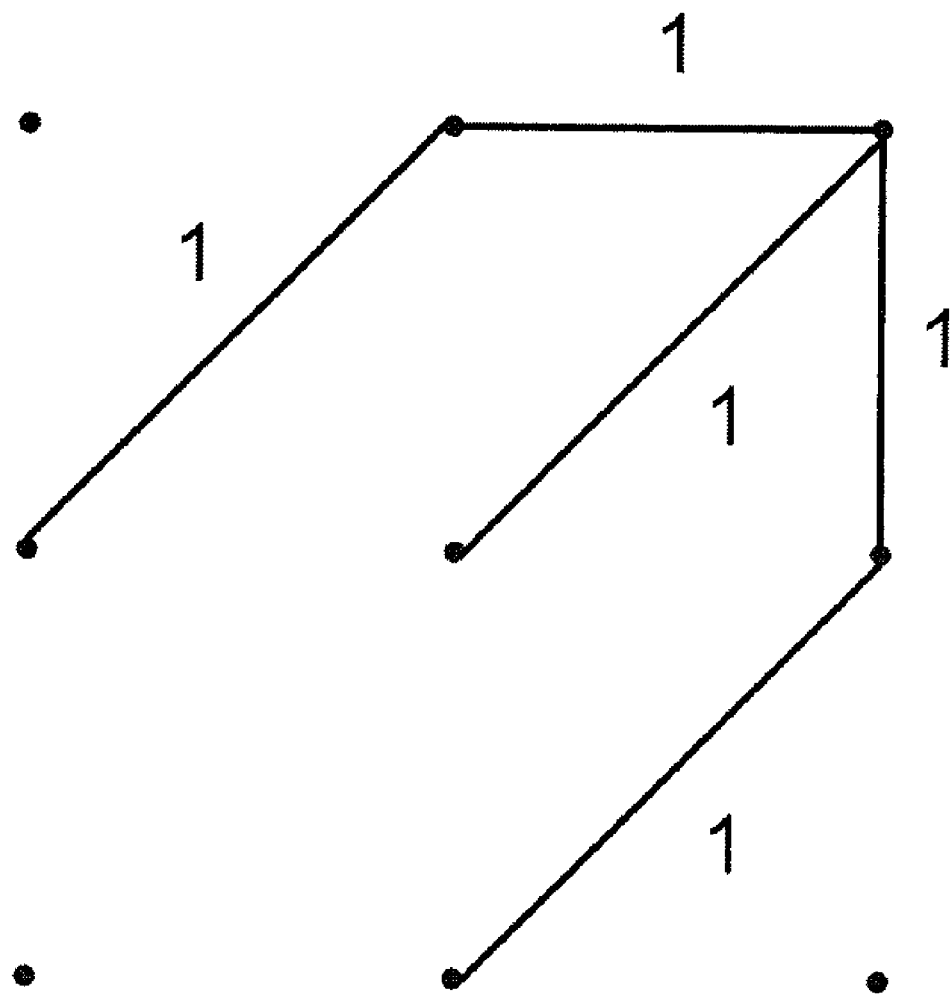
FIG. 5 illustrates the local continuity constraints and slope weights for computation of the Euclidean distance, under an embodiment.

FIG. 5 illustrates the slope weights for computation of Euclidean distance, under an embodiment.

Each DTW computation starts from a certain frame on the test pattern. Since the ending frames for the best matching parts on test and reference patterns are not known, an l×l end-point free area is introduced. The end-point free area depends on the length of the $v^{th}$ reference pattern, $N_v$. The dimensions of the area are determined experimentally by equation (5) below:

$$\lambda = \begin{cases} N_v \times 0.1 & N_v < 30 \\ N_v \times (4) & 30 \leq N_v < 40 \\ N_v \times 0.45 & N_v \geq 40 \end{cases} \quad (5)$$

The least accumulated distance score ($D_{min}$) is selected within this area. The frames that correspond to $D_{min}$ are the ending frames on both the test and the reference patterns for the best matching result.

Pattern comparison by DTW is executed recursively for all possible reference and test pattern pairs starting from the beginning to the end of the test pattern as shown. A code segment for an example computational routine or subprogram is shown in FIG. 6A as follows:

for starting frame ← 1 to $M - N$ compute $D_{min}$ if $D_{min}$ < threshold then save the frames as repetition In one embodiment, the recursive DTW computation is executed for each reference pattern. FIG. 6B illustrates a code segment for an example repetitive computational routine or subprogram for recursive DTW, under an embodiment. For this process, a maximum reference pattern length (max.ref.length) is defined. The reference patterns that are longer than this maximum reference pattern length are curtailed by skipping frames from the beginning until the length decreases to max.ref.length.

The algorithm 2.1 shown in FIG. 6B computes the accumulated distance scores between every possible reference and test pattern pair, and saves the matching parts below a distance threshold as the candidates of repetitions. These matching parts are further processed according to the energy level, zero-crossing rate and length, and they are combined to form the final repetition segments.

Under embodiments, a DTW-based algorithm is used to detect the repeated parts between two utterances in a dialogue session. The algorithm is based on computation of the distance score between two patterns by the DTW algorithm. The normalized accumulated distance scores for similar words converge to a certain normalized value, thus classification of a pattern as repetition is possible according to a distance threshold. The reference patterns are generated from the correction utterance. When manually partitioned segments that correspond to the words in the utterance are used as the reference patterns, the algorithm has been shown to produce a rate of 97.6% for the detection of the repetitions and a rate of 98.1% for correct rejection of the non-repetitions, under certain controlled experiments.

In general, a challenge arises at the automatically segmentation of the correction utterance. The embodiments described for segmentation generates fragments that have boundaries close to the actual words in the utterance. An accumulated distance score is computed for every possible combination of the reference and test patterns to find the exact boundaries for the repeated parts. The patterns in the original utterance that match the reference pattern with a distance score below the threshold are selected as the repetitions. The repetition patterns are combined to form the actual repeated segments. By using all combinations of pairs of utterances, experiments have shown that a detection rate of 80.3% is achieved as well as a rate of 85.2% for the non-repetitions. These experiments show that improvements in the segmentation scheme generally increase the detection rate.

Figures 7, 8:
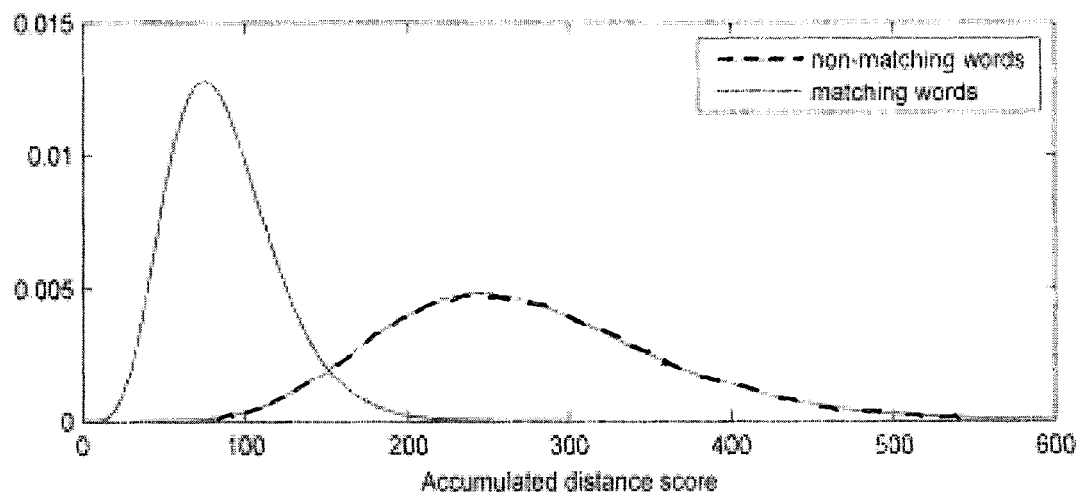
FIG. 7 is a table that illustrates the parameters for an experimental setup to test the effectiveness of a repeat detection system, under an embodiment.
FIG. 8 illustrates the distribution of the accumulated distance scores for the matching and non-matching words, for experimental data under an embodiment.

At least one of the experiments mentioned above to evaluate the performance of the system used a set of 192 recordings organized in 25 subject groups. The utterances in each subject group were spoken by one person and each group consisted of 5-10 recordings. The system was trained by using the same set of recordings and manually segmenting each utterance into words. FIG. 7 is a table that illustrates the parameters for an experimental setup to test the effectiveness of a repeat detection system, under an embodiment. In this experiment, the accumulated distance scores between each word were computed, and a distance score threshold was determined. The resulting distribution of the accumulated distance scores for the matching and non-matching words is shown in FIG. 8. Within each subject group, each utterance was taken as the test utterance, and compared with the other utterances to find the repeated parts. The accumulated distance score was normalized by the number of test frames in each computation and the dimension of the feature vectors, thus a global distance measure was computed to evaluate the performance under various experimental conditions. A complete set of 1275 pairs of utterances were used, and the repeated parts detected by the system were examined to evaluate the performance.

Figure 9:
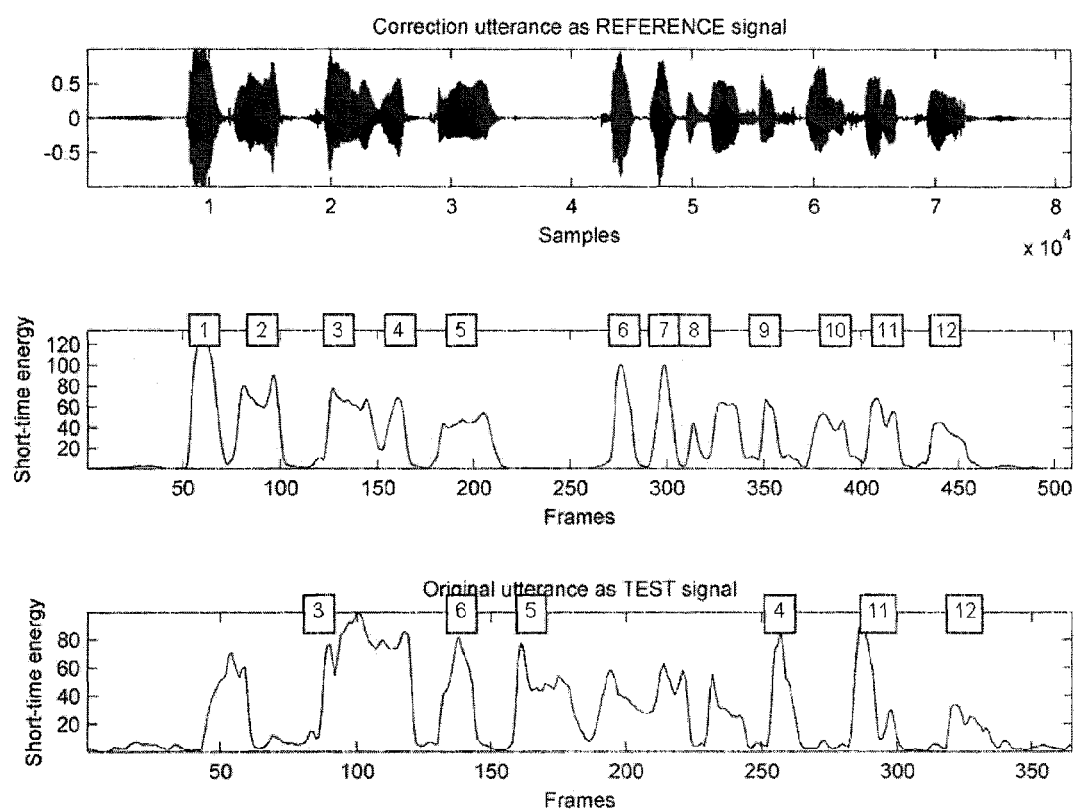
FIG. 9 illustrates the output of an experimental repeat detection system showing the repeated parts in the original signal as well as the corresponding reference patterns.

After processing the signals, the experimental system output the repeated parts in the original signal as well as the corresponding reference patterns as shown in example of FIG. 9. The experimental performance was evaluated by the detection rate, miss rate and false alarm rate. The detection is the rate of the correctly detected (repeated) words, and is given by using the following equation:

$$\text{Detection-rate} = \frac{\#\_of\_correctly\_detected\_words}{\#\_of\_repeated\_words\_in\_test\_utterance}$$

Results for certain experiments were provided as follows: for repeated words, a true positive result of 80.3% and a false negative result of 19.7% were achieved; and for non-repeated words, a true positive result of 85.2% and false negative result of 14.8% was achieved.

Aspects of the repeat detection system and process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the repeat detection method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the repeat detection process is not intended to be exhaustive or to limit the embodiments to the precise form or instructions disclosed. While specific embodiments of, and examples for, processes in Internet search engines are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the repeat detection process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method of detecting repeated patterns in a dialog system, comprising:
    receiving an initial utterance from a user in the dialog sequence as a set of test patterns, the initial utterance including a first plurality of words in a first order;
    receiving a correction utterance from the user, the correction utterance including a second plurality of words in a second order, wherein at least some of the second plurality of words are repeated from the first plurality of words;
    segmenting the correction utterance into a set of reference patterns by identifying silence regions separating each of the first plurality of words within the initial utterance;
    extracting feature vectors from the test patterns and the reference patterns;
    comparing each test pattern with each reference pattern over the entire length of the set of test patterns and the set of reference patterns, using a dynamic time warping process in order to determine boundaries of the reference and test patterns using spectral characteristics of the initial and correction utterances;
    computing distance scores between each reference pattern and each test pattern; and
    identifying test patterns with a distance score that is less than a defined distance threshold as a repeated pattern.

2. The method of claim 1 wherein the correction utterance is provided by the user in response to an output from the dialog system, and further wherein both the correction utterance and the initial utterance comprise spoken user input and the repeated patterns that are selected from the group consisting of: words, syllables of words, and phrases of multiple words.

3. The method of claim 2 wherein the segmenting step further comprises:
    extracting statistical characteristics of the silence regions using an endpoint detection process;
    computing a zero-crossing rate threshold for the silence regions
    computing an energy threshold for the speech segments;
    determining if the length of a speech segment is less than a defined length threshold; and
    saving a speech segment as a reference pattern if its length is less than the defined length threshold, or dividing the speech segment into two or more sub-segments if its length is greater than the defined length threshold.

4. The method of claim 3 wherein the defined length threshold is determined by a process comprising one of experimental determination, or theoretical calculation.

5. The method of claim 4 wherein the initial utterance and correction utterance are each defined by a set of feature parameters.

6. The method of claim 5 wherein the feature parameters comprise Mel frequency cepstral coefficients.

7. The method of claim 6 wherein the feature parameters comprise 13-dimension feature vectors generated at a defined frame rate.

8. The method of claim 7 wherein the frame rate comprises 100 frames per second.

9. The method of claim 6 further comprising applying a raised sine liftering function to control non-information bearing components of the cepstral coefficients.

10. The method of claim 1 further comprising:
    defining reference and test pattern pairs for each possible combination of test and reference patterns;
    recursively applying a dynamic time warping process on each reference and test pattern pairs;
    defining a maximum reference pattern length; and
    identifying matching patterns as reference patterns of a reference and test pattern pair with a distance score that is less than the defined maximum reference pattern length.

11. A method of repetition detection in a dialog system comprising:
    receiving an initial user utterance as a first sequence of segments, the initial utterance including a first plurality of words in a first order;
    providing an interpretive output to the user based on the initial user utterance;
    receiving a correction utterance in response to the interpretive output, the correction utterance including a second plurality of words in a second order, wherein at least some of the second plurality of words are repeated from the first plurality of words;
    segmenting the correction utterance into a second sequence of segments by identifying silence regions separating each of the first plurality of words within the initial utterance;
    aligning each segment from the second sequence with each segment from the first sequence over the entire length of the first and second sequences to determine boundaries of the segments using spectral characteristics of the initial and correction utterances;
    determining a distance score for each segment from the first sequence with each segment from the second sequence;
    comparing each distance score with a defined score threshold; and
    identifying segments with a distance score below the defined score threshold as a repeated segment.

12. The method of claim 11 wherein each of the initial user utterance and the correction utterance comprises spoken user input and the segments are selected from the group consisting of: words, syllables of words, and phrases of multiple words.

13. The method of claim 12 wherein the step of segmenting the correction utterance comprises finding a word boundary for each segment, wherein a word boundary comprises an intersection of a silent section and a spoken section within the utterance.

14. The method of claim 13 further comprising defining a set of feature parameters for each of the first sequence of segments and the second sequence of segments.

15. The method of claim 13 wherein the feature parameters comprise Mel frequency cepstral coefficients.

16. A system for detecting repeated patterns in a dialog system, comprising:
   a speech recognizer hardware component receiving an initial utterance from a user in the dialog sequence as a set of test patterns, and receiving a correction utterance from the user in response to an output from a response generator of the dialog system, wherein the initial utterance includes a first plurality of words in a first order and the correction utterance includes a second plurality of words in a second order, wherein at least some of the second plurality of words are repeated from the first plurality of words;
   an event detector hardware component detecting the occurrence of repeated segments between the initial utterance and the correction utterance;
   a segmentation hardware component segmenting the correction utterance into a set of reference patterns by identifying silence regions separating each of the first plurality of words within the initial utterance;
   a feature extraction hardware component extracting feature vectors from the test patterns and the reference patterns; and
   a pattern comparison component of the event detector comparing each test pattern with each reference pattern over the entire length of the set of test patterns and the set of reference patterns, using a dynamic time warping process in order to determine boundaries of the reference and test patterns using spectral characteristics of the initial and correction utterances, and computing distance scores between each reference pattern and each test pattern to identify test patterns with a distance score of less than a defined distance threshold as a repeated pattern.

17. The system of claim 16 further comprising a decision rule hardware component defining the distance threshold.

18. The system of claim 17 wherein the initial utterance comprises spoken user input and the repeated patterns are selected from the group consisting of: words, syllables of words, and phrases of multiple words.

19. The system of claim 18 wherein the segmentation hardware component comprises:
   means for identifying silence regions separating speech segments within the initial utterance;
   means for extracting statistical characteristics of the silence regions using an endpoint detection process;
   means for computing a zero-crossing rate threshold for the silence regions
   means for computing an energy threshold for the speech segments;
   means for determining if the length of a speech segment is less than a defined length threshold; and
   means for saving a speech segment as a reference pattern if its length is less than the defined length threshold, or dividing the speech segment into two or more sub-segments if its length is greater than the defined length threshold.

20. The system of claim 19 wherein the initial utterance and correction utterance are each defined by a set of feature parameters.

21. The system of claim 20 wherein the feature parameters comprise Mel frequency cepstral coefficients.

22. The system of claim 21 wherein the pattern comparison hardware component further comprises:
   means for defining reference and test pattern pairs for each possible combination of test and reference patterns;
   means for recursively applying a dynamic time warping process on each reference and test pattern pairs;
   means for defining a maximum reference pattern length; and
   means for identifying matching patterns as reference patterns of a reference and test pattern pair with a distance score that is less than the defined maximum reference pattern length.

* * * * *